United States Patent [19]

Waters et al.

[11] Patent Number: 4,627,731
[45] Date of Patent: Dec. 9, 1986

[54] COMMON OPTICAL PATH INTERFEROMETRIC GAUGE

[75] Inventors: James P. Waters, Ellington; Mark R. Fernald, Enfield, both of Conn.

[73] Assignee: United Technologies Corporation, Hartford, Conn.

[21] Appl. No.: 772,106

[22] Filed: Sep. 3, 1985

[51] Int. Cl.[4] .............................................. G01B 9/02
[52] U.S. Cl. .................................. 356/349; 356/345; 356/358
[58] Field of Search ............... 356/345, 349, 352, 357, 356/358, 359, 360

[56] References Cited

U.S. PATENT DOCUMENTS 3,812,496  5/1974  Brooks ........................... 356/349 X
3,877,813  4/1975  Hayes et al. ..................... 356/349
4,013,366  3/1977  Philbert ........................... 356/358
4,368,981  1/1983  Ozeki .............................. 356/349 X Primary Examiner—Eugene R. LaRoche
Assistant Examiner—Steven J. Mottola
Attorney, Agent, or Firm—J. Kevin Grogan

[57] ABSTRACT

A common optical path interferometric gauge comprises an optical beam that is split into two beams. Both beams are modulated and recombined after introducing an optical path length difference greater than the coherence length of the optical source. The combined beam is guided along a common optical path and is subsequently split into reference and measurement beams. The measurement beam is guided along a measurement optical path that includes a moving workpiece surface. Both beams are recombined after interposing an optical path length difference therebetween so as to reestablish coherence between portions thereof, producing optical interference indicative of the surface movement.

6 Claims, 3 Drawing Figures

COMMON OPTICAL PATH INTERFEROMETRIC GAUGE

DESCRIPTION

1. Technical Field

This invention relates to interferometric gauging systems and more particularly to optical gauges having interferometers with common optical paths.

2. Background Art

With the advent of optical fibers, a large number of interferometric fiber optic measuring systems have been developed. These devices have widespread application in measuring vibration and dynamic distortion of mechanical components. Moreover, fiber optic inteferometers are especially suited to metrology because of the flexibility and size of the components involved.

Fiber optic interferometers of the prior art include those characterized as a modified Mach-Zehnder or Twyman-Green interferometers. In their simplest form, these interferometers use light from a coherent source split into two optical beams. The first beam is used as a reference and traverses an optical path of fixed length. The other beam is guided along an optical path whose length is altered by the external workpiece being measured. The beams are subsequently recombined to produce an interference pattern indicative of the vibration or dynamic distortion of the mechanical element.

Heterodyne optical interferometers are also well known in the art. These devices are similar to basic Mach-Zehnder and Twyman-Green interferometers but are modified to include an optical modulator which shifts the optical frequency of the reference and/or measurement beam. As in the basic Mach-Zehnder or Twyman-Green interferometers, the measurement beam's optical path length is altered by a vibrating external element. Both beams are su sequently recombined, yielding a frequency modulated (FM) beam with a carrier frequency equal to the frequency of the optical modulator and deviations from the carrier caused by the vibration or dynamic distortion of the mechanical element. The component due to the motion of the mechanical element is extracted by conventional FM demodulation techniques.

In fiber optic gauging systems of the prior art, both the reference and measurement beams are guided along optical paths that include separate optical fibers. This configuration insures that a truly stationary reference wavefront is used for comparison with the unknown Doppler shifted wavefront returning from the workpiece. However, the optical fibers act as microphones in picking up environmental noise. This environmental noise signal is comprised of unwanted Doppler shifts due to environmental vibrations and slight variations in the refractive index of the optical fiber carrying the measurement or reference beam, and is added to the measured vibration signal from the workpiece which results in a distortion of its vibration frequency and amplitude signature and has effectively precluded the use of fiber optic conventional or heterodyne interferometers in typical manufacturing environments.

DISCLOSURE OF INVENTION

An object of the present invention is to provide an optical interferometric gauge that has a common optical path for indicating mechanical motion of an external workpiece surface.

According to the present invention, a common optical path interferometric gauge comprises an optical source providing a partially coherent optical beam to an optical apparatus that splits the optical beam into first and second beams and provides optical modulation thereto. The first and second beams are guided along first and second optical paths respectively whose optical path length difference is selected to be greater than the coherence length of the optical source. Also included is a common optical path means comprising a combiner for combining the first and second beams and guiding the combined beam therein. The common optical path means subsequently splits the combined beams to form reference and measurement beams. The reference beam is guided along the reference optical path and the measurement beam is guided along the measurement optical path that includes a workpiece surface. The optical path lengths of the measurement and reference beams are selected so that the difference therebetween is approximately equal to the difference between said first and second optical paths. The common optical path means further provides for recombining the measurement and reference beams forming an interference beam. The common optical path interferometric gauge also includes a detector for receiving the optical interference beam and providing an electrical signal equivalent thereof, as well as a signal processor for receiving and demodulating the electrical signal to determine a component thereof indicative of the motion of the workpiece surface.

BRIEF DESCRIPTION OF DRAWINGS

FIG. 3 is an illustration of an end section of a common optical fiber used with the common path interferometric gauge of FIG. 1.

BEST MODE FOR CARRYING OUT THE INVENTION

Figure 1:
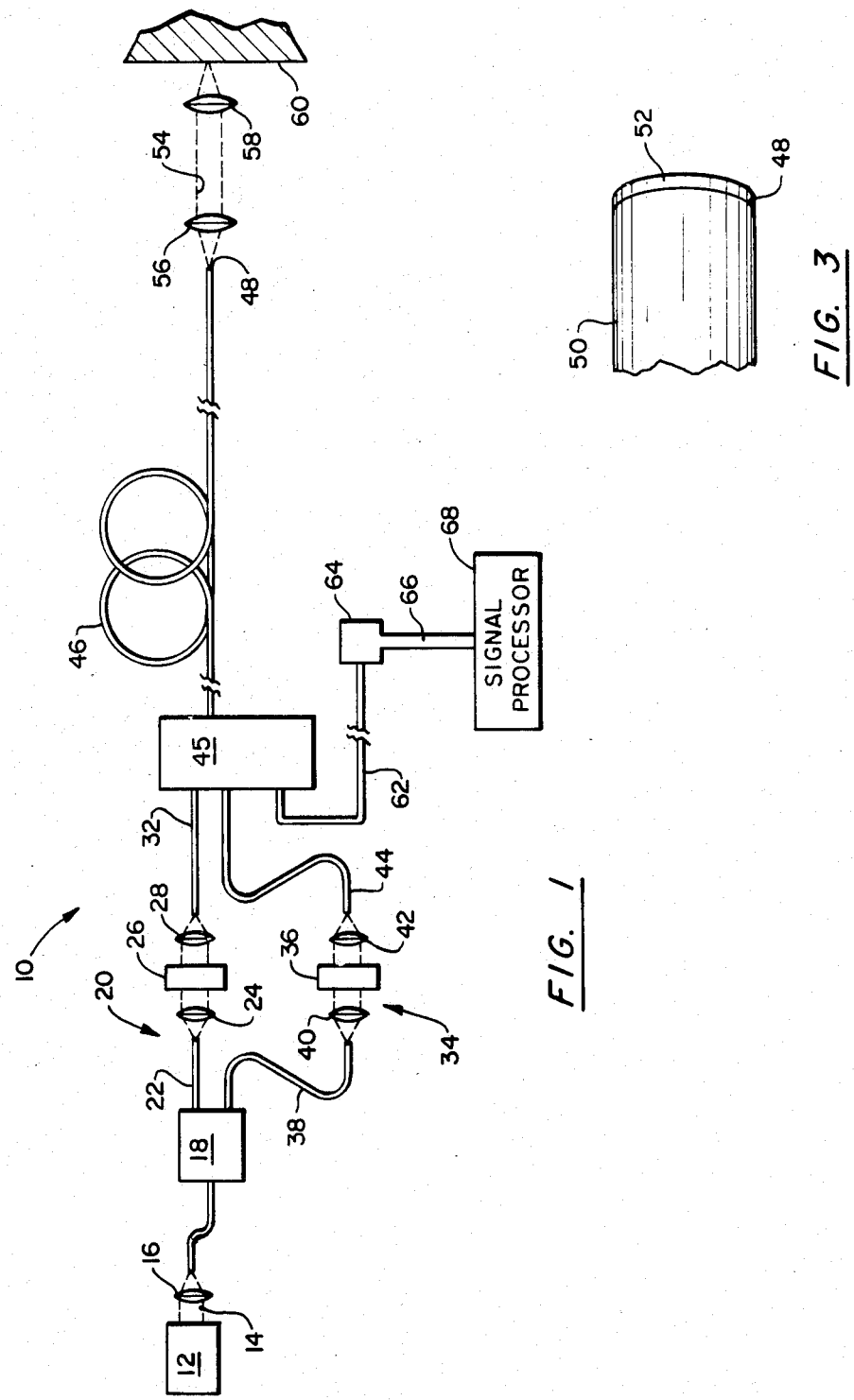
FIG. 1 is a block diagram of a common path interferometric gauge provided according to the present invention.

Referring to FIG. 1, in a simplified block diagram of the common path interferometric gauge provided according to the present invention, the common path laser interferometer 10 includes an optical source 12 of partially coherent light such as a conventional laser diode. The optical source generates optical beam 14 which is provided to lens 16 that focuses the light onto an input fiber of beam splitter 18 which comprises a fiber optic beam splitter in the best mode embodiment, but those skilled in the art will note that equivalent discrete beam splitters can be substituted. In the best mode embodiment the laser diode comprises a Sharp LT023MC, emitting light at a wavelength of 780 nanometers.

The fiber optic beam splitter divides the optical beam into first and second beams that are guided along first and second optical paths, respectively. The first optical path 20 includes fiber optic section 22, collimating lens 24, and acousto-optic modulator 26. The modulator is of a type known in the art and in the best mode embodiment comprises a Brag cell such as a Hoya A-100 type modulator which downshifts the optical frequency of the first beam by approximately 75 MHz. The frequency shifted first beam is provided to lens 28 which focuses the beam into fiber optic section 32. Lens 28, as well as the lenses mentioned hereinabove, can be any of a type well known in the art, and in the best mode embodiment comprise microscope objectives. Optical fiber section 32 is typical of the fiber optic sections used with the interferometric gauge provided according to the present invention and comprises a Corning glass on glass type fiber having a core diameter of approximately 5–9 microns, has a step index of refraction and a numerical aperture of 0.1, although those skilled in the art will recognize that an equivalent multimode or single mode fiber may be selected.

The second beam 34 leaves the beam splitter and is received by an acousto-optic modulator 36 similar to acousto-optic modulator 26 described hereinabove after traversing fiber optic section 38 and lens 40. In the best mode embodiment modulator 36 upshifts the optical frequency by approximately 85 MHz. Those skilled in the art will note that the common path interferometric gauge provided according to the present invention may be constructed with only a single modulator located in either the first or second optical path. As detailed hereinafter, the additional modulator is provided to reduce carrier signal feed-through during the demodulation of the optical signals.

The frequency shifted second beam exits lens 42 and is focused into an optical fiber section 44. Those skilled in the art will note that although optical fibers have been used to guide the first and second optical beams, equivalent optical means may be substituted in the respective optical paths.

The partially coherent optical source can be characterized by a coherence length, defined to be the optical path length difference in which optical beams eminating from the same source will interfere. If the optical path lengths traversed by the beams differ by an amount which exceeds the coherence length, the beams are said to be incoherent. In the common path interferometric gauge provided according to the present invention, the difference between the optical path lengths of the first and second beams are selected to be greater than the coherence length of the optical source so as to render the two beams incoherent. In the best mode embodiment, the first beam traverses a longer optical path than the second beam and is expressed as $$L_1 - L_2 > l_c$$

where $L_1$ is the optical path length of the reference beam and $L_2$ is the optical path length of the measurement beam and $l_c$ is the coherence length of the optical source.

Both beams are provided to bidirectional optical coupler 45 of a type known in the art such as a ITT T-7270. The beams combined therein are provided to a common optical path, which in the best mode embodiment comprises common optical fiber section 46. Since the difference between the optical paths of the reference and measurement beams exceeds the coherence length of the optical source, no interference can occur between the beams propagating within the common optical fiber section. The identity of the individual beams will not be lost when coherence between selected portions of the combined beam is subsequently reestablished.

A portion of the combined optical signal is internally reflected from end face 48 of the common optical fiber section. This reflected portion comprises the reference beam and includes power from both the first and second beams. The reflection can be accomplished by techniques known in the art, and can include the use of common optical coatings or just the Fresnel reflection from the end face. FIG. 3 illustrates a section 50 of the common optical fiber section and end face 48 with an optical coating 52 formed thereon.

The remaining power of the combined beam comprises measurement beam 54 and includes the remaining power of both the first and second beams. The measurement beam exits the common optical fiber section and is provided to conventional collimating lens 56 and subsequently to focusing lens 58 where it is focused on moving workpiece surface 60. Note that in some configurations a single lens can be used to collect and focus the light. The reflected light from the workpiece surface traverses back through lenses 58 and 56 and reenters the common optical fiber section.

The length of the optical path traversed by the measurement beam is selected so that the first beam portion thereof has an overall optical path length that is approximately equal to the overall second beam optical path length to within the coherence length of the laser diode. Upon reentering the common optical fiber section, the second beam portion of the reference beam reflected at the end face and the first component of the measurement beam will interfere because they are once again coherent.

An interference beam formed therebetween will propagate back to the optical coupler where a portion thereof is split off and provided on lines 62 to detector 64 that is of a type well known in the art, such as a conventional silicon avalanche photodiode. The detector provides an electrical signal equivalent to the interference beam on lines 66 to signal processor 68. Those skilled in the art will note that other equivalent detectors may be substituted and may include additional conventional preamplification or filtering devices.

The signal processor can demodulate at either the sum or difference of the frequencies provided by the modulators. In the best mode embodiment, the signal processor comprises a filter whose pass band includes the difference frequency of 160 MHz and a conventional radio frequency mixer, which shifts the detection signal down to the 100 MHz FM frequency band. The signal processor also comprises a conventional FM receiver. The FM receiver provides signals indicative of the motion of the workpiece surface. Those skilled in the art will recognize that demodulation at the difference frequency requires appropriate modifications to the signal processor described in the best mode embodiment. Moreover, those skilled in the art will recognize that other equivalent signal processing means, both analog and digital can be substituted.

Figure 2:
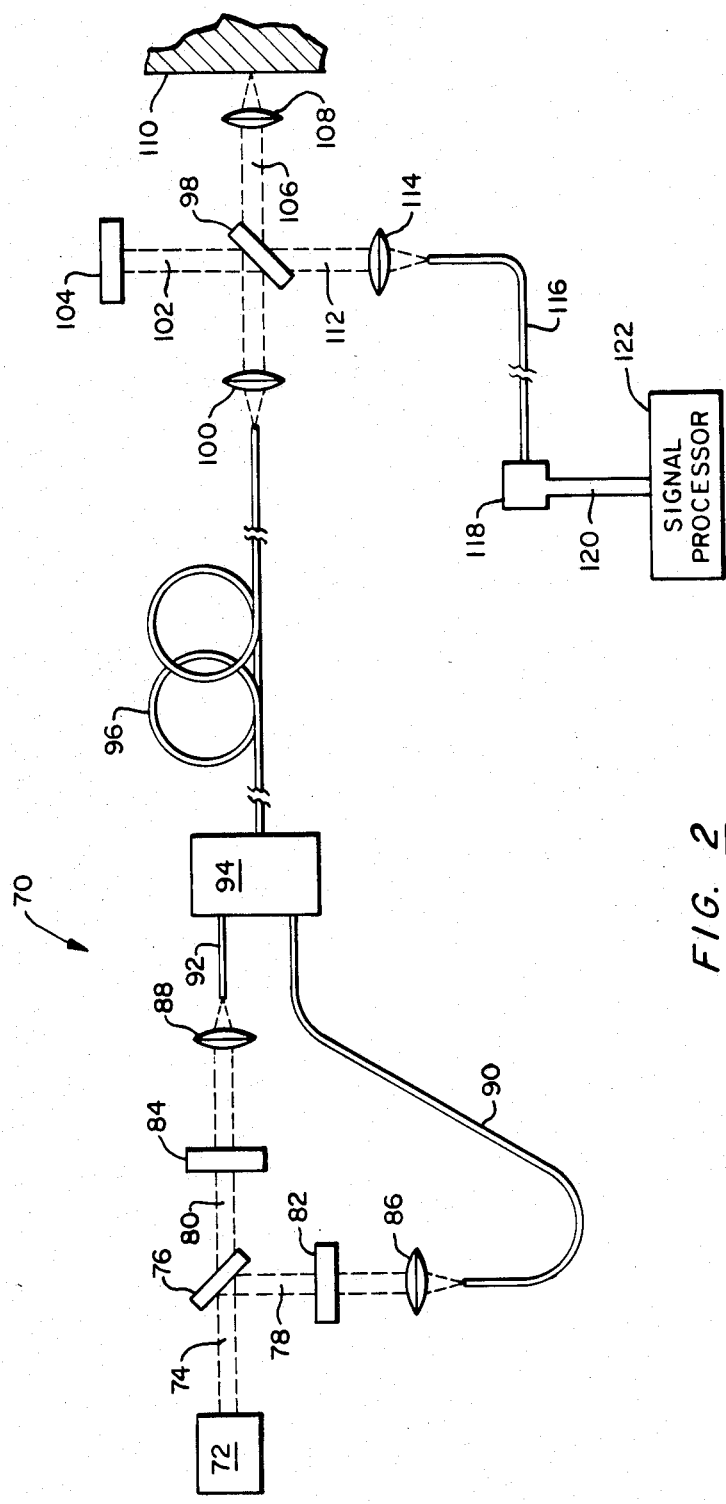
FIG. 2 is an alternative embodiment of the common path interferometric gauge of FIG. 1.

FIG. 2 is an alternative embodiment 70 of the common path interferometric gauge of FIG. 1 illustrating the use of certain discrete optical components and which similarly includes light source 72 that provides partially coherent beam 74 to first beam splitter 76 producing first and second beams 78 and 80 that are provided to acousto-optic modulators 82 and 84. Both beams are focused by lenses 86 and 88 into optical fiber sections 90 and 92. As in the common path interferometric gauge of FIG. 1, the optical path length traversed by each beam is selected so that the difference therebetween exceeds the coherence length of the coherent light source. The beams are combined in beam coupler 94. The first and second beam components of the combined beam will not interfere while propagating along a common optical path such as common optical fiber section 96 for reasons detailed hereinbefore with respect to FIG. 1.

In addition to components and structures identical with the common path interferometer described hereinbefore with respect to FIG. 1, the alternative common path interferometric gauge of FIG. 2 comprises second beam splitter 98 or equivalent fiber optic coupler which receives the combined beam after collimation by lens 100 as it exits the common path optical fiber section. The second beam splitter produces a reference beam 102 that comprises a portion of both of the first and second beams and is reflected off mirror 104. The remainder of the combined beam comprises measurement beam 106 that is focused by lens 108 onto and back from the workpiece surface 110.

Both the measurement and reference beam include light from the first and second beams which have previously been rendered incoherent by adjusting the optical path length difference to be greater than the coherence length of the partially coherent source. Optical coherence between the second beam portion of the reference beam and the first beam portion of the measurement beam can be restored by adjusting the optical path length difference therebetween to be less than the coherence length of the partially coherent source.

An interference beam 112 is produced at the second beam splitter by the portion of the beams that have been renderd coherent and is collimated by lens 114 and provided to an optical guide means such as fiber optic section 116 and ultimately to detector 118 which generates an electrical signal equivalent of the interference beam. The signal is provided on lines 120 to signal processor 122 which is identical to the signal processor described hereinabove with respect to FIG. 1. The FM receiver component thereof generates a signal indicative of the motion of the workpiece surface.

Those skilled in the art will note that the optical interferometric gauge provided according to the present invention is symmetrical in the relative positioning of the detector and optical source. In the embodiments provided in FIGS. 1 and 2 the detector and optical source can be interchanged without affecting the performance of either interferometric gauge.

By using a common optical path for the reference and measurement beams, slight changes in index caused by environmental noise sources affect both beams equally, thus eliminating the problem of microphonic pickup. Because of the way in which the beams are delayed, a stationary reference wavefront, with respect to the wavefront returning from the target, is still generated which insures an accurate measure of the Doppler shift produced by the vibrating workpiece.

Similarly, although the invention has been shown and described with regard to a best mode embodiment, it should be understood by those skilled in the art that various other changes, omissions and additions thereto may be made therein, without departing from the spirit and scope of the invention.

We claim:

1. A common optical path interferometric gauge for measuring motion of a workpiece surface, comprising:
    optical source means for providing an optical beam having a coherence length;
    optical apparatus for splitting said optical beam into first and second beams and providing modulation thereto, said first and second beams guided along first and second optical paths respectively, having an optical path length difference selected to be greater than said coherence length;
    common optical path means responsive to said first and second beams for forming a combined beam therefrom, guiding said combined beam therein, and splitting said combined beam into reference and measurement beams, guided respectively along a reference optical path and a measurement optical path including the workpiece surface, said measurement and reference optical paths having an optical path length difference selected to be approximately equal to the optical path length difference between said first and said second optical paths such that coherence is restored therebetween, said common path means combining said reference and measurement beams forming an interference beam;
    detector means for receiving said interference beam and providing an electrical signal equivalent thereof; and
    signal processing means for receiving and demodulating said electrical signal to determine a component thereof indicative of the motion of the workpiece surface.

2. The common optical path interferometric gauge of claim 1, wherein said common optical path means further comprises bidirectional coupler means for forming said combined beam, optical fiber means for guiding said combined beams having an end face for splitting said combined means at said end face, said bidirectional coupler means further providing said interference beam to said detector means.

3. The common optical path interferometric gauge of claim 2, wherein said end face has a reflective optical coating formed thereon.

4. The common optical path interferometric gauge of claim 1, wherein said optical modulator means comprises an acousto-optic modulator.

5. The common optical path interferometric gauge of claim 1, wherein said optical source means comprises a laser diode.

6. The common optical path interferometric gauge of claim 1, wherein said common optical path means further comprises optical coupler means forming said combined beam, optical fiber means guiding said combined beam therein and beam splitter means for splitting said combined beam and for providing said interference beam to said detector means.

* * * * *